(No Model.)

T. A. EDISON.
REGULATOR FOR DYNAMO OR MAGNETO ELECTRIC MACHINES.

No. 263,134. Patented Aug. 22, 1882.

Attest:
O. D. Mott
H. W. Seely

Inventor:
T. A. Edison
per Dyer & Wilber
Attys.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO OR MAGNETO ELECTRIC MACHINES.

SPECIFICATION forming part of Letters Patent No. 263,134, dated August 22, 1882.

Application filed May 28, 1881. (No model.)

*To all whom it may concern:*

Be it known that I, THOMAS A. EDISON, of Menlo Park, in the county of Middlesex and State of New Jersey, have invented a new and useful Improvement in Dynamo and Magneto Electric Machines, (Case No. 314;) and I do hereby declare that the following is a full and exact description of the same, reference being had to the accompanying drawings, and to the letters of reference marked thereon.

The object I have in view is to produce simple and efficient means for regulating the generative force of a dynamo or magneto electric machine, so that only the amount of current needed in a circuit may be supplied thereto and the pressure or electro-motive force maintained constant in the circuit. For this purpose I make use of the principle that the power of an electro-magnet can be weakened by diminishing the mass of the yoke connecting the cores, and that such power can be strengthened by increasing the mass of said yoke until the maximum power is attained. In applying this principle I provide the yoke of the field-of-force magnet of a dynamo or magneto electric machine with a movable portion, the position of which can be varied so as to effect the mass and conducting-power of such yoke, said movable portion acting as a magnetic-circuit regulator. This movable portion is preferably situated in the center of the yoke, and is of conical shape, being supported by a spindle which passes through bars connected with the top and bottom of the yoke, and separated therefrom by plates of brass or other non-magnetic material. The position of this movable cone may be adjusted by means of a hand-wheel working on the screw-threaded stem of the cone; or the cone may be drawn into the yoke by an electro-magnet (preferably an axial magnet) the coils of which are in a shunt or derived circuit from the main or consumption circuit, or directly in the main circuit. This magnet forms means for adjusting the cone automatically. Were the yoke entirely cut through, the uniting piece or part varying the mass might become entirely displaced, so that there would be no effect. The construction noted then varies the mass of this yoke only within certain definite limits, the yoke always being complete to a greater or less extent, independent of the position of the movable piece.

Figure 1:
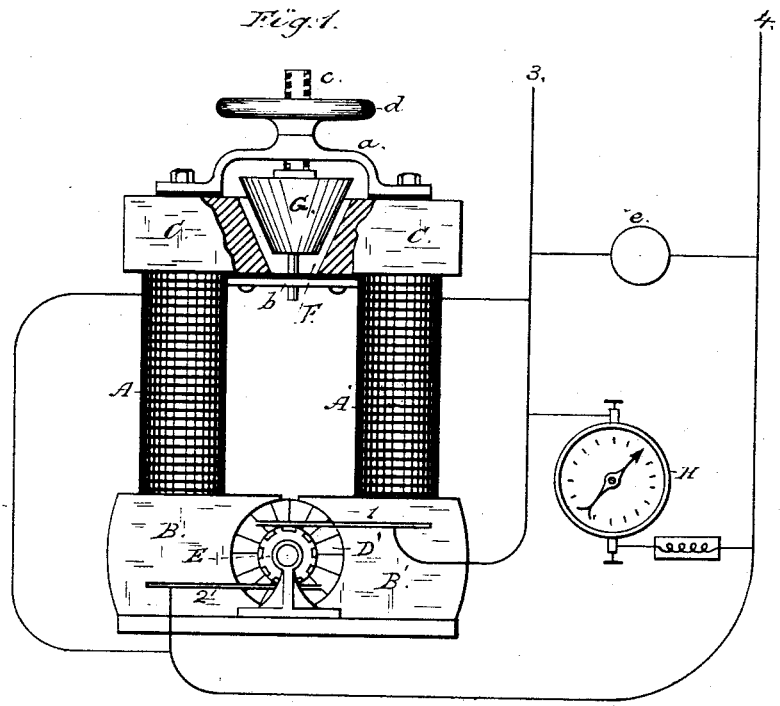
Figure 2:
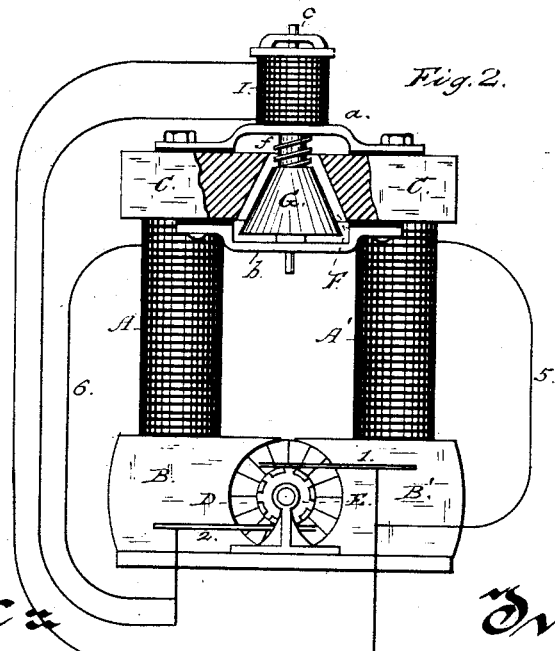

In the drawings, Figure 1 is an end elevation of a dynamo or magneto electric machine and connections, with the yoke partly broken away to disclose the magnetic-circuit regulator; and Fig. 2, a similar view, showing the magnetic-circuit regulator operated automatically by the electro-motive force of the main or consumption circuit through an electro-magnet.

Like letters denote corresponding parts in both figures.

A A' are the helices of the field-of-force magnet; B B', the pole ends of the same; C, the yoke or bar connecting the helix-cores; D, the revolving armatures of the machine, and E the commutator-block. The commutator brushes or springs 1 2 lead from the block E to the main or consumption circuit 3 4. The field-of-force magnet may be energized by the derived circuit 5 6 or by the main circuit of another generator. The yoke C has a central conical opening, F, passing vertically through it, in which plays the conical block G, forming the magnetic-circuit regulator. This cone is supported by bars $a$ $b$, secured to the yoke, and separated therefrom by brass plates. The stem $c$ of the conical block may be screw-threaded and receive above the bar $a$ a hand-wheel, $d$, having an internal screw-thread, by turning which hand-wheel the position of the cone with relation to the yoke can be adjusted.

The translating devices represented by $e$ are in derived circuits, while an electro-dynamometer, H, is also situated in a circuit derived from the main circuit 3 4, and serves to guide the attendant in his adjustment of the magnetic-circuit regulator. When the electro-motive force increases beyond the desired intensity the attendant retracts the cone, and vice versa, and thereby diminishes or increases the energy of the field-of-force magnet, and consequently the electro-motive force of the current induced in the bobbin of the revolving armature. It is possible, therefore, by these means to maintain a nearly-constant pressure or electro-motive force in the main circuit 3 4.

In Fig. 2 an axial magnet, I, is used to draw the cone into the yoke, the same being retracted by a spring, $f$, and by its own weight. The coil of this magnet is in the main or consumption circuit. When the magnet I is used it is not necessary to employ an electro-dynamometer; but one may be used to check the operation of the magnet.

What I claim is—

1. In a dynamo or magneto electric machine, the yoke of the field-magnet, having an opening through the same, in combination with a block adjustable in and out of said opening, substantially as set forth.

2. In a dynamo or magneto electric machine, the combination, with the yoke of the field-magnet, provided with a conical opening, of a conical block adjustable in and out of said opening, substantially as set forth.

3. In a dynamo or magneto electric machine, the field-of-force magnet, the yoke of which has an adjustable portion acting as a magnetic-circuit regulator, in combination with means operated by the current generated for automatically adjusting said adjustable portion, substantially as set forth.

4. The combination, with the yoke of the field-magnet of a dynamo or magneto electric machine provided with an adjustable portion for regulating the generation of current, of an electro-magnet placed in the main circuit from said machine for adjusting said adjustable portion according to variations in the current required, substantially as set forth.

This specification signed and witnessed this 19th day of May, 1881.

THOMAS A. EDISON.

Witnesses:
RICHD. N. DYER,
H. W. SEELY.